United States Patent Office 3,644,445
Patented Feb. 22, 1972

3,644,445
CYCLOMATIC METAL CARBONYLS CONTAINING METAL-METAL BOND
Wolfram R. Kroll, Linden, N.J., assignor to Esso Research and Engineering Company
No Drawing. Continuation-in-part of application Ser. No. 600,032, Dec. 8, 1966. This application Mar. 17, 1969, Ser. No. 807,998
Int. Cl. C07f 5/06
U.S. Cl. 260—429       10 Claims

ABSTRACT OF THE DISCLOSURE

A catalyst formed by the reaction of a transition metal carbonyl hydride, particularly a Group VI transition metal, and an organoaluminum compound has unusual activity, especially as a catalyst for hydrogenation, polymerization, dimerization and oxo type reactions.

FIELD OF THE INVENTION

This application is a continuation-in-part of copending Ser. No. 600,032 filed Dec. 8, 1956, now U.S. Pat. No. 3,439,054, issued Apr. 15, 1969.

This invention relates to novel catalyst complexes, means for preparing such complexes and the use of such catalyst complexes in varied reactions including hydrogenation, oxo, polymerization and dimerization reactions. More particularly, this invention relates to novel catalysts prepared by the reaction of a transition metal carbonyl hydride, and in particular a Group VI carbonyl hydride and an organo metallic compound. Typical organo metallic compounds include Group III organo compounds, i.e. Al derivatives such as aluminum alkyls and aluminum alkyls to which a Lewis base has been added.

In a preferred embodiment the catalyst is utilized to activate molecular hydrogen, particularly in the hydrogenation of unsaturated organic compounds; the catalyst may also be used effectively in oxo type reactions as well as polymerization of various compounds such as propylene oxide and dimerization of olefins.

Organoaluminums have previously been utilized in the preparation of catalysts such as the Ziegler type catalyst systems. In those instances, the organoaluminum compound serves as a reducing agent wherein its only function is to reduce a transition metal to the zero valence state; no metal-metal bond is formed.

SUMMARY OF THE INVENTION

According to this invention it has been found that a transition metal carbonyl hydride and in particular a Group VI carbonyl hydride may be reacted with an organo metallic compound, wherein the metallic compound is a Group III metal, preferably aluminum to form a new, active catalyst containing a Group III, i.e., aluminum-transition metal, i.e., Group VI metal bond.

The transition metal may be any transition metal selected from Groups IV to VIII of the Periodic Chart of Elements; most preferred metals are those of Group VI which includes chromium, molybdenum and tungsten.

Since the transition metal is employed as the carbonyl hydride, more than one form is available.

Generally, the carbonyl hydride has the formula:

$$H_pMe_s(CO)_m$$

wherein Me is a transition metal and $m$ is 4 to 11, $p$ is 1 to 2, and $s$ is 1 to 3. Some metal hydrocarbonyls are somewhat difficult to handle and possess relatively high toxicity and volatility; therefore, the preferred carbonyl hydride to be utilized will have the formula $HMeXn(CO)_m$, wherein Me is preferably a Group VI transition metal, $m$ is greater than zero and smaller than four and X is an unsaturated ligand which can have the general configuration of a cyclomatic ligand $n$ is equal to or less than 2. Of course, polynuclear transition metal carbonyl hydrides can be utilized in this invention.

Preferred cyclomatic ligands are cyclopentadienyl radicals and their derivatives; that is to say, cyclomatic hydrocarbon radicals having from 5 to about 20 carbon atoms which embody a group of 5 carbons having the general configuration found in cyclopentadiene. These radicals are discussed at length in U.S. Pat. 2,987,534, the disclosure of which is herein incorporated by reference. Alternatively, cyclomatic ligands which have 5 to 20 carbon atoms and embody a group of 5 or 6 carbon atoms having the general configuration found in cyclopentadiene may be utilized.

To form the catalyst, an organo Group III, i.e., aluminum compound is contacted with the transition metal carbonyl hydride at atmospheric or subatmospheric pressure and ambient or elevated temperatures. The reaction should be carried out under an inert anhydrous atmosphere to avoid decomposition by moisture and oxygen.

Specifically, several organoaluminum compounds may be utilized in this invention. A preferred configuration has the general formula $AlR_3$ wherein R is independently selected from the group consisting of hydrogen and hydrocarbyl radicals; it should be noted that any Group III metal may be utilized instead of Al. Preferred hydrocarbyl radicals have one to twenty carbon atoms and hydrogen, more preferred are $S_1$ through $C_{20}$ alkyls, $C_3$ through $C_{20}$ cycloalkyls, and $C_6$ through $C_{20}$ aryl. Most preferred radicals are $C_2$ through $C_8$ alkyls or hydrogen; at least one R must be a hydrocarbyl radical. Typical examples of compounds which may be employed are triethyl aluminum, tributyl and triisobutyl aluminum, trimethylaluminum, triphenylaluminum, diethylaluminum cyclopentadienyl, diethylaluminum allyl, diethyl isobutyl aluminum, ethyl dibenzyl aluminum, triheptylaluminum, trioctylaluminum, tricyclohexyl aluminum, diethylaluminum phenyl and like.

If one R is to be hyrogen then compounds such as diethylaluminum hydride, diisobutyl aluminum hydride may be utilized.

New compounds of the general formula may also be utilized, namely $HAlY_2$ where Y may be halogen, pseudo halogen, alkoxy or alkyl mercapto and Y is as previously defined. In this case the resulting complex is represented by the formula $$Y_2Al-MeX_n(CO)_m$$

In addition, organoaluminum compounds can be used that have more than one hydrogen attached to the aluminum. Typical examples of such compounds are: $H_2AlY$ where Y can be halogen, pseudo halogen, alkoxy, alkyl-mercapto or alkyl, or complex compounds like $Me'[AlH_4]$, $Me'[AlH_3X]$, $Me'[AlH_2X_2]$ and $Me'[Al HX_3]$ where $Me'$ is an alkali metal cation or any other cation that can stabilize these complexes including $NR_4^{(+)}$, $PR_4^{(+)}$ and others. These complexes can react with the transition metal carbonyl hydride to give complexes of the general type $$Me'[AlY_s(MeX_n(CO)_m)_{4-s}]$$

where $3 \geq S >$ zero.

Alternatively, instead of a free organoaluminum compound a Lewis base adduct may be utilized which is formed by reacting a Lewis base with an organoaluminum compound. Typical Lewis bases which may be utilized are monodentate ligands as the amines, phosphines, phosphites, ethers, thioethers, bidentate ligands as 1,2 dimethoxy-ethane, tetramethyl ethylenediamine, 1,2-bis(diphenyl-phosphino) ethane and others, and tridentate ligands as triphosphines.

The reaction of the transition metal carbonyl and the organoaluminum compound normally takes place in the liquid phase in the presence of a suitable inert solvent. Such solvents may be paraffinic, preferably having 5 through 20 carbons such as pentane, heptane, octane, nonane, etc.; $C_6$ through $C_{12}$ aromatics such as benzene and the like; halogenated aromatics and paraffins may also be effectively employed. Preferred solvents are aromatics as exemplified by benzene and toluene.

Temperatures for the reaction may vary between —40 and 200° C., preferably between 0° and 120° C., and most preferably between ambient and 60° C. Pressures may also vary widely and will generally be between subatmospheric and 60 p.s.i., although atmospheric pressure is preferred. Pressures should be sufficient to maintain the reactants in liquid phase. The catalyst is generally prepared in an inert atmosphere such as nitrogen, argon, methane, etc.

The molar ratio of organoaluminum and Group VI carbonyl hydride depends on the amount of substitution desired. If one desires to make a mono-substituted organoaluminum derivative as

$$R_2Al-MeX_n(CO)_m$$

then a 1:1 ratio of aluminum compound and transition metal carbonyl hydride is sufficient. If one wants to substitute more than one group of the aluminum, a higher ratio is required, as e.g. in the following:

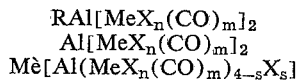

$$RAl[MeX_n(CO)_m]_2$$
$$Al[MeX_n(CO)_m]_2$$
$$Mè[Al(MeX_n(CO)_m)_{4-s}X_s]$$

In carrying out the reactions involving the novel catalyst complexes of this invention, the catalyst may be preformed and added to the reaction mixture as such, or may be formed in situ. Thus, for example, to a mixture of molybdenum carbonyl hydride and an unsaturated compound, an aluminum trialkyl may be added directly or, the carbonyl hydride and aluminum trialkyl may be reacted prior to the addition of the unsaturated component. It is preferred, however, to form the catalyst reaction product prior to its introduction into the reaction mixture.

It is advantageous to age the catalyst for a period of time after formation and prior to its use in order to increase its catalytic activity. Such aging is done for a period of 15 minutes to several days depending upon the particular type of catalyst. The catalyst complex described herein may be used in homogeneous liquid phase or a solid in a fixed bed, fluid bed or slurry type operation. Recovery of the solid catalyst is often possible by conventional separation procedures. The separation can be done by a variety of well-known means such as distilling away volatile components, centrifugation, filtration, settling and decantation. The catalyst may also have its activity enhanced by moderate heat treatment; by moderate heat treatment it is meant treatment at 40 to 100° C.

The resulting catalyst composition may have two different general formulas depending upon the reactants. Initially, the catalyst may have the formula $R_2M-ME(CO)_m$ wherein R may be as previously defined, M is a Group III metal, preferably aluminum, Me is a transition metal, preferably a Group VI transition metal, and $m$ is 4 to 5.

Alternatively, the transition metal carbonyl hydride may have included an unsaturated ligand in which case the catalyst will have the formula $R_2M-MeX_n(CO)_m$ wherein R is as previously defined, M is a Group III metal, preferably aluminum, Me is a transition metal, preferably a Group VI transition metal, X is as previously defined, $n$ is equal to or less than 2 and may be 0 and $m$ is equal to or greater than 1, but not more than 6.

The catalyst described herein may be employed in a variety of hydrogenation reactions; by hydrogenation reaction it is meant the combination of hydrogtn with another substance. Thus, the catalyst of the instant invention may be employed for the hydrogenation of unsaturated organic compounds. Additionally, this catalyst is useful for oxo type reactions. Oxo reactions are those reactions in which carbon monoxide and hydrogen are added to alkenes in the presence of the catalyst to produce aldehydes and ketones which subsequently can be reduced to the corresponding alcohol. These reactions are discussed at length in the book "Higher Oxo Alcohols," Enjay Co., Inc., 1957, herein incorporated by reference.

More specifically, the catalyst complexes described herein may be employed to reduce unsaturated compounds and preferably reduce unsaturation in organic compounds which have carbon-carbon, carbon-nitrogen and carbon-oxygen as in carbonyl unsaturation. The catalyst may also be employed in the complexing and fixation of nitrogen as well as in the hydrogenation of nitrogen to form ammonia. In addition, the catalyst may be used for olefin dismutation, e.g., pentene-1 to octene-4 and ethylene.

Feeds containing carbon-carbon unsaturation may be acetylenic, olefinic, aromatic, or mixtures thereof. These feeds may be acyclic, cyclic, substituted or unsubstituted and may contain dienes and trienes. Typical examples of such compounds are: butenes, pentenes, cyclopentene, cyclopentadiene, cyclooctadiene, vinyl cyclohexene, benzene, phenylacetylene, toluene, naphthalenes and the like. It is obvious to those skilled in the art that some of the above-disclosed unsaturated compounds will be more difficult to reduce than others. Therefore preferred unsaturated carbon-carbon compounds are those compounds, preferably of 2 through 30 carbon atoms, which contain ethylenic unsaturation, i.e., non-aromatic or acetylenic unsaturation.

Among the carbonyl compounds that can be reduced are aldehydes, ketones, esters, etc. Typical examples of these compounds include acetone, cyclohexanone, benzophenone, acetophenone, phorone, benzaldehyde, acetaldehyde, benzoacetate, ethyl stearate, etc.

Compounds containing carbon-nitrogen unsaturation may also be reduced in the presence of these novel catalysts. Such compounds are illustrated by benzonitrile and the like.

Regarding the use of the instant catalyst in polymerization, the following may be polymerized: propylene epoxide, ethylene oxide, epichlorohydrin, allyl glycidyl ether, propylene episulfide, isobutylene and others. Also copolymerizations of different types of cyclic ethers are possible.

In addition, the catalyst of the instant invention may be used for the preparation of olefin dimers. In particular, the following dimers may be produced: butadiene dimers, e.g. vinyl-cyclohexene, propylene dimers and ethylene oligomers.

For dimerization reactions generally conditions are employed in which the catalyst in liquid phase is reacted with the monomer at ambient to elevated temperatures. Generally temperatures of ambient to 200° C. are employed, when the preferred range is ambient to 150° C. The pressures used in this reaction can be from atmospheric to one thousand pounds. A preferred range is from atmospheric to 500 p.s.i. In some cases it seems to be advantageous to irradiate the catalyst with an ultraviolet source to increase activity. For polymerization essentially the same reaction conditions apply.

With regard to hydrogenation, reaction conditions may normally vary over a wide range. In general, temperatures may range from about ambient to 300° C., preferably 50 to 200° C. In the case of olefin unsaturation, hydrogenation temperatures will range from —20 to +200° C., preferably plus 20 to 150° C. and pressures from atmospheric to 2000 p.s.i. may be employed. Reaction times may vary widely from several seconds to several hours or more. Typical reaction times will vary from one minute to ten hours. Catalyst concentration may vary from 0.0001 to about 10.0 weight percent based on the transition metal, which is preferably a Group VI metal. A more preferable range would be from 0.1 to 2.0 weight percent.

Typical hydrogenation reactions which may be accomplished with the instant catalyst include: hydrogenation of acetylenic compounds; hydrogenation of dienes such as butadienes in olefinic feed streams as exemplified by the selective hydrogenation of butadiene in an ethylene stream; hydrogenation of terminal olefinic bonds in preference to internal olefinic bonds, such as the preparation of mono-olefin monomers in the preferential hydrogenation of hexene-1 in the presence of cyclohexene; hydrogenation of aliphatic unsaturation in the presence of cyclic unsaturation such as in monomer preparation; hydrogenation of aliphatic or alicyclic unsaturation in preference to aromatic unsaturation, such as styrene to ethylbenzene and hydrogenation of olefinic unsaturation in organic compounds having other functional groups such as unsaturated esters, acids, hydrides, aldehydes and ketones.

The catalyst compositions of this invention can also be used to create new types of heterogeneous catalysts. This is done by impregnating a homogeneous solution of this catalyst, e.g., in benzene, onto a solid support. The support can be an oxydic one of the type commonly used in the preparation of heterogeneous catalysts, e.g., alumina, silica, or silica-alumina. It can be also a non-oxydic support like charcoal, graphite, boron nitride, tungsten carbide, and others. After the impregnation the solvent is removed by standard techniques, (e.g., heating at atmospheric or subatmospheric pressure). The heating is then continued in order to fix the catalyst on the support. Subsequently, the catalyst is ready for the specific application, e.g., hydrogenation, aromatization, olefin dismutation, etc.

SPECIFIC EMBODIMENTS

Example 1

Separate one molar benzene solutions of three trialkyl aluminums $AlR_3$, methyl, alkyl and isobutyl, and tricarbonyl molybdenum cyclopentadienyl hydride were prepared. One mmole of each of the trialkyl aluminum solutions was added at ambient temperature and pressure to 1 mmole of the molybdenum hydride in solution in glass equipment. Gas evolution on all three occasions indicated that a reaction was occurring; the solution was originally yellow and after several hours became deep red in color. Analyses by nuclear magnetic resonance and qualitative as well as quantitative analysis of the gases formed in the reaction indicated the following products had been produced.

TABLE I

Starting compound $AlR_3$:                  Resulting product
R=
    methyl ____ $(CH_3)_2Al—Mo(CO)_3X$.
    ethyl _____ $(C_2H_5)_2Al—Mo(CO)_3X$.
    isobutyl ___ $(i·C_4H_9)_2Al—Mo(CO)_3X$ where X is cyclopentadienyl.

Example 2

In this example the identical conditions to Example 1 were utilized except that 1 mmole of di-isobutylaluminum hydride was reacted with 1 mmole of tricarbonyl-molybdenum-cyclopentadienyl hydride. Hydrogen was evolved and the reaction was completed after about 15 minutes. Analysis by N.M.R. indicated that the reaction product was di-isobutyl-aluminum-molybdenum tricarbonyl cyclopentadienyl.

Example 3

In this example the identical conditions to Example 2 were utilized except that in three successive experiments the Lewis base 1:1 adduct of (1) para-dioxane, (2) triphenylphosphine and (3) triethylamine with diisobutyl-aluminum hydride was used in the reaction with the tricarbonyl - cyclopentadienyl - molybdenum hydride. The reaction occurred at ambient temperature with gas evolution. Generally it was completed in less than one hour which was indicated when no more gas was evolved. In each case, n.m.r. and infrared spectra revealed that adducts were formed of the general type $$[(i·C_4H_9)_2Al—Mo(CO)_3X]\ B$$

wherein B=para-dioxane, triphenylphosphine and triethylamine.

Example 4

In this example the same conditions as in Example 2 were utilized except that one mmole of diisobutyl- aluminum hydride in solution was reacted with one mmole tricarbonyl tungsten cyclopentadienyl hydride in solution. The reaction was completed in about one hour at which time it was observed that no more gas evolved. The n.m.r. analysis indicated that complete conversion had occurred and that the reaction product was diisobutyl aluminum tungsten tricarbonyl cyclopentadienyl.

Example 5

In this example the exact conditions and reactants of Example 2 were utilized except that the Lewis Base adducts of (1) para-dioxane, (2) triphenylphosphine, and (3) triethylamine with diisobutyl-aluminum hydride were utilized. The reaction products were determined by n.m.r. and i.r. to be $$[(i·C_4H_9)_2Al—W(CO)_3X]\ B$$

wherein B=para-dioxane, triphenylphosphine and triethylamine.

Example 6

In this example, two mmoles of one molar $$(i·C_4H_9)_2AlH$$

in benzene were added at ambient temperature and pressure to 2 mmoles of one mol $HMoC_5H_5(CO)_3$ in benzene in glass equipment at ambient temperature. The evolution of hydrogen lasted for about 15 minutes at which time a reddish solution was formed. Six grams of neat propylene oxide were added to this solution; an immediate reaction, as indicated by a rise in temperature, was observed. The reaction was then continued for about 2.8 hours at 80° C. in a closed vessel at which time the reaction was interrupted by cooling to ambient temperature and vacuo stripping of the product to remove solvent and unreacted monomer. A colored rubbery solid polymer (4.0 g.) remained, which material showed little solubility in benzene.

This indicates the catalytic activity of the complex $$(i·C_4H_9)_2Al—MoC_5H_5(CO)_3$$

as a catalyst for the polymerization of propylene oxide.

Example 7

One mmole of the catalyst solution in toluene prepared in the previous example was irradiated with a commercial ultraviolet lamp in the presence of butadiene for 2 hours at ambient temperature. Subsequently, it was heated with a total of 28 g. butadiene in a steel bomb for 17 hours at a temperature of 100° C. Analysis by gas chromatography indicated at 7.5% conversion by weight to 4-vinylcyclohexene-1. This example indicates the catalytic activity of aluminum-molybdenum complex for the dimerization of butadiene.

Example 8

In this example, one mmole of the 1:1 Lewis base adduct of $(i·C_4H_9)_2Al—MoC_5H_5(CO)_3$ with triphenyl phosphine in toluene was irradiated with an ultraviolet lamp for a period of 2 hours in the presence of butadiene. Subsequently, the mixture was transferred into a steel autoclave and more butadiene was added (total amount of butadiene present 28 g). The mixture was heated in a steel bomb to 100° C. over a period of 14 hours. Analysis by gas chromatography indicated 11% of butadiene had been converted to 4-vinyl-cyclohexene-1.

Example 9

5 mmoles of the diisobutyl-aluminum-molybdenum-cyclopentadienyl tricarbonyl in hexane of Example 2 were contacted with 10 milliliters of 1.5-cyclooctadiene. The mixture was hydrogenated in an autoclave at 250 p.s.i. and 100° C. for 3 hours. Analysis by gas chromatography on a solvent-free basis gave 4.1% cyclooctene, 9.2% cyclooctane and 86.7% by weight unreacted starting material, illustrating the hydrogenation ability of the instant catalyst.

Example 10

In this example, 4 millimoles of the catalyst from Example 1 were contacted with 100 ml. of hexene-1 at a temperature of 170° C. at 3200 p.s.i. incipient pressure of synthesis gas, for about 12 hours. Analysis of the product by gas chromatography indicated a yield of 12% $C_7$ aldehyde with a normal to iso product ratio of 41:59. This shows that the instant aluminum-molybdenum catalyst has activity in the oxo reaction.

Example 11

In this example, the catalyst was prepared in the manner identical to that of Example 1 except that tungsten was substituted for molybdenum; again, an oxo reaction for hexene-1 was preformed. Four mmoles of the catalyst complex in benzene were contacted with 100 milliliters of hexene-1 at 170° C. for 12 hours at 3500 p.s.i. incipient pressure of synthesis gas. Analysis of the product produced a 22% yield of $C_7$ aldehyde with a normal to iso product ratio of 31:69.

What is claimed is:

1. A process for producing a metal-metal bonded catalyst which comprises contacting, at a temperature of between −40 and 200° C. and at a pressure sufficient to maintain the reactants in a liquid phase, an organo metallic compound having the general configuration $R_3Me$ wherein R is selected independently from the group consisting of hydrogen and $C_1$–$C_{20}$ hydrocarbyl radicals and Me is a Group III metal, or Lewis base adducts of $R_3Me$, and a transition metal carbonyl hydride wherein said transition metal carbonyl hydride is characterized by the general formula $HMeX_n(CO)_m$ wherein Me is a Group VI transition metal, $m$ is greater than 0 and smaller than 4, and X is an unsaturated ligand selected from the group consisting of cyclopentadienyl radicals having from 5 to about 20 carbon atoms, and $n$ is equal to or less than 2.

2. The process of claim 1 wherein said transition metal is molybdenum.

3. The process of claim 1 wherein said transition metal is tungsten.

4. The process of claim 1 wherein Me is aluminum and R is selected independently from the group consisting of $C_1$ to $C_{12}$ alkyl radicals.

5. A composition of matter having the configuration $R_2Me$—$MX_n(CO)_m$ wherein R is selected independently from the group consisting of $C_1$–$C_{20}$ hydrocarbyl radicals, Me is a metal selected from Group III of the Periodic Chart of Elements, M is a Group VI transition metal, X is a cyclomatic ligand selected from the group consisting of cyclopentadienyl radicals having from about 5 to 20 carbon atoms, $n$ is $\leq 2$ and $1 \leq m$ [M] $< 6$.

6. The composition of claim 8 wherein the complex is bonded to a Lewis base selected from the group consisting of mono-, bi, and tridentates.

7. The composition of claim 6 wherein said Lewis base is selected from the group consisting of triphenylphosphine, triethylamine, and p-dioxane.

8. The composition of claim 5 wherein Me is aluminum.

9. The composition of claim 5 wherein said transition metal is molybdenum.

10. The composition of claim 5 wherein said transition metal is tungsten.

References Cited

UNITED STATES PATENTS

| | | | |
|---|---|---|---|
| 3,006,940 | 10/1961 | Fischer et al. | 260—429 CY |
| 3,247,270 | 4/1966 | Kirk | 252—428 X |
| 3,304,269 | 2/1967 | Kroll et al. | 252—431 X |
| 3,439,054 | 4/1969 | Kroll | 252—431 X |

PATRICK P. GARVIN, Primary Examiner

U.S. Cl. X.R.

252— 431 R, 431 N, 431 P; 260—438.5, 604, 2 A, 683.15, 683.9